July 13, 1965   R. D. SCHIBLEY   3,194,149
ROTISSERIE APPARATUS
Filed July 24, 1963   2 Sheets-Sheet 1

INVENTOR
Raymond D. Schibley
BY

July 13, 1965  R. D. SCHIBLEY  3,194,149
ROTISSERIE APPARATUS

Filed July 24, 1963  2 Sheets-Sheet 2

United States Patent Office 3,194,149
Patented July 13, 1965

3,194,149
ROTISSERIE APPARATUS
Raymond D. Schibley, Ashland, Ohio, assignor to Westinghouse Electric Corporation, Pittsburgh, Pa., a corporation of Pennsylvania
Filed July 24, 1963, Ser. No. 297,347
7 Claims. (Cl. 99—421)

This invention relates to rotisseries in general, and more particularly to a rotisserie for use in the oven of a domestic range.

In the copending United States patent applications of Edmund H. Filipak, Serial No. 277,946, filed May 3, 1963, now abandoned, and Raymond D. Schibley, Serial No. 284,237, filed May 29, 1963, both assigned to the assignee of the present invention, there is disclosed an arrangement wherein a spit member is disposed in an oven enclosure in side-to-side relation. In the aforementioned arrangement, the spit rotating means is pivotably supported to permit movement of one end of the spit member from a supported position in the enclosure to a position adjacent the enclosure opening, for removal or insertion of the loaded spit. Among the advantages of the "side-to-side" spit location over prior art barbecue arrangements are a more effective utilization of the available space in the oven enclosure, and the ease of basting a barbecue which is so disposed.

In the present invention, a novel drive assembly is provided for rotating the spit in "side-to-side" arrangement in the oven enclosure to obtain the advantages of the previously disclosed arrangements. However, with the present invention, the drive assembly permits the spit rotating means to be fixedly attached to the oven structure during movement of the spit member from a supported position in the oven enclosure, to a position adjacent the enclosure opening, for removal or insertion of the loaded spit. By employing the present invention, the spit rotating means may be remotely disposed from the hot oven liner, while providing a relatively small opening in the liner for insertion of the spit end. In addition, electrical connections which may be part of the spit rotating means are less likely to become loosened or worn by movement of the rotating means relative to the oven structure.

It is therefore an object of the present invention to provide an improved rotisserie arrangement for use in an oven enclosure which arrangement has an easily removable and installable spit disposed in side-to-side relation to the enclosure and a fixedly attached spit rotating means.

Another object of the invention is to provide a novel drive assembly for an oven rotisserie.

A further object of the invention is to provide a rotisserie arrangement wherein the spit is located in side-to-side relation to the oven enclosure and the spit rotating means is located remote from the enclosure.

For a better understanding of the invention, reference should be had to the accompanying drawings, in which.

Although the principles of the invention are broadly applicable to rotisserie apparatus in general, it has been herein illustrated employed in rotisserie apparatus of a domestic oven, and will be so described.

Figure 1:
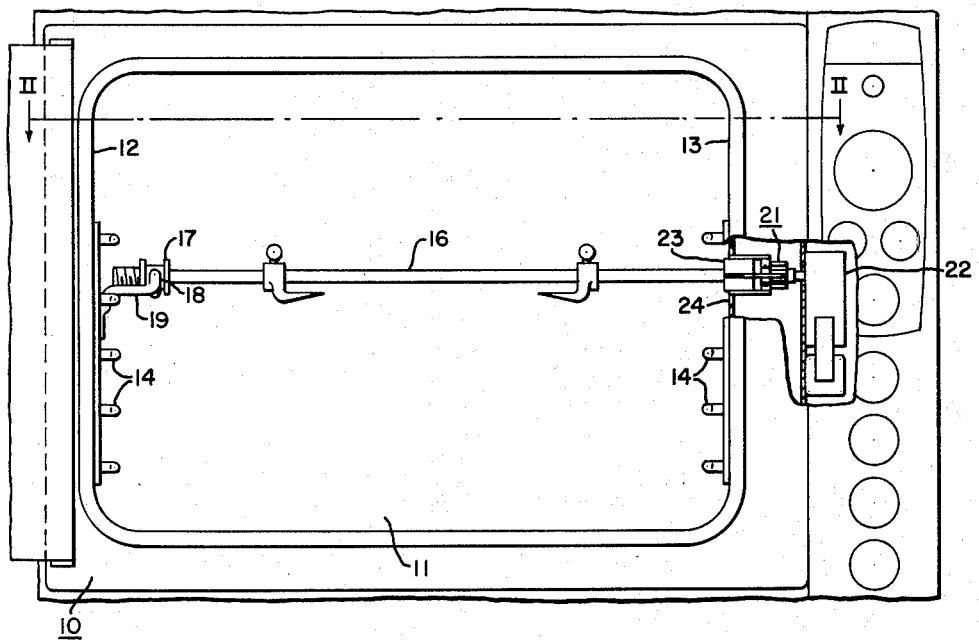
FIGURE 1 is a front elevational view of a domestic oven having the invention employed therein; a portion of the oven front wall structure being broken away to more clearly show the invention.
Figure 2:
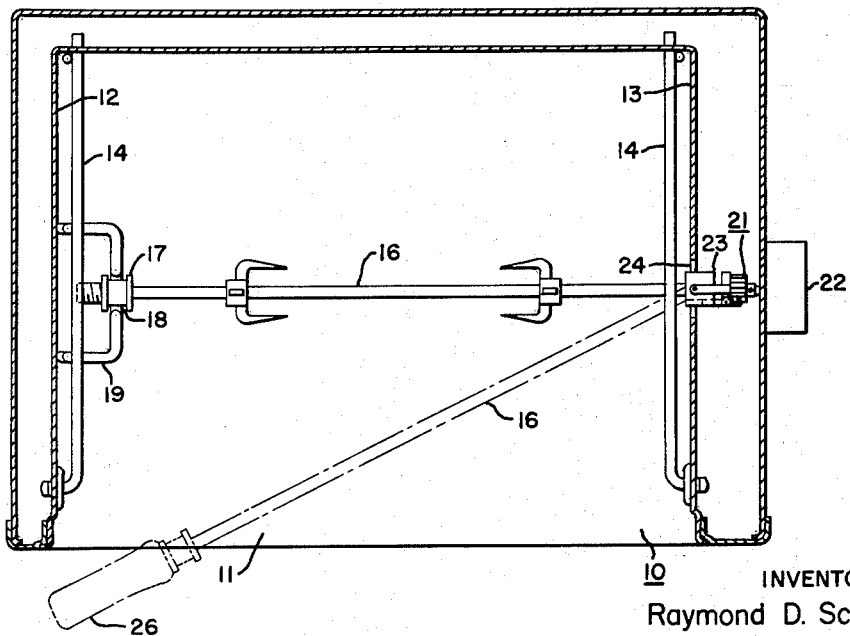
FIG. 2 is a horizontal sectional view taken along line II—II of FIG. 1.

Referring to the drawings, especially FIGS. 1 and 2, there is shown a domestic oven 10 having an enclosure 11 formed by the oven walls, including side walls 12 and 13. A plurality of glide members 14 are disposed adjacent the side walls 12 and 13 for slidably receiving, and supporting, oven racks when the oven is used for purposes other than barbecuing.

For the preparation of barbecued foods, the oven 10 is provided with rotisserie apparatus including a spit member 16 disposed in the enclosure 11 in side-to-side relation between the walls 12 and 13. The spit member 16 has a spool portion 17 provided adjacent one end which is received in a U-shaped opening 18 provided on the support means 19 disposed adjacent the wall 12. The opposite end of the spit member 16 is received in axially fitting engagement by the drive assembly 21 which includes a fixedly mounted electrical motor 22 serving as means for turning the spit member about its rotational axis.

As is best shown in FIG. 2, the drive assembly 21 is provided with a collet 23 pivotably supported adjacent the wall 13 and extending through an opening 24 in the wall to receive the spit member 16. The magnitude of the opening 24, and the pivotable collet 23 combine to permit movement of the spit member 16 to a position adjacent the front opening of the enclosure 11 as shown in the dot-dash lines in FIG. 2. In this position, a removable handle 26 is installed on the spit member 16 and the member is readily removed or installed by axial movement of the spit member relative to the collet 23.

Figure 3:
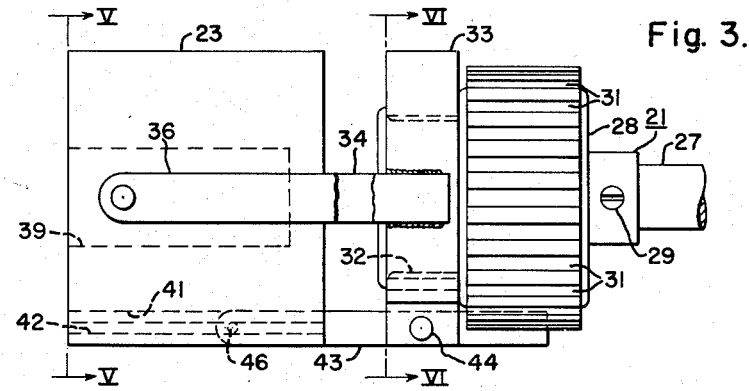
FIG. 3 is a top plan view of the spit drive arrangement of FIGS. 1 and 2, shown on a large scale for clarity.

Referring now to FIGS. 3 through 6, the drive assembly 21, in addition to the electric motor 22 and collet 23, includes a shaft 27 driven by the motor and having mounted thereon a cylindrical member 28 retained on the shaft by a set screw 29. A portion of the cylindrical member 28 has a series of spline ways 31 formed on the surface, and a journal 32 is provided on the portion adjacent the splined surface. A bearing member 33 is received on the journal 32 for rotation thereon, and has a pair of support bars 34 and 36 extending axially with respect to the shaft 27. The collet 23 is pivotably disposed between the support bars 34 and 36, being connected thereto by a pair of pins 37 and 38 loosely fit in the support bars. In addition to a rectangular opening 39 provided in the collet 23 for axial engagement of the spit member 16, the collet is provided with a rectangular groove 41 extending radially inwardly from the outer surface of the collet and having a pair of ways 42 disposed on opposite faces of the groove. A key member in the form of a rectangular bar 43 is pivotably attached to the bearing member 33 by a pivot pin 44 and has a glide pin 46 which is slidably received in the ways 42 of the collet 23. The opposite end of the key member 43 extends beyond the pivot pin 44 and adjacent the spline ways 31; the spline ways and the key member being of dimensions which provide locking engagement between the members when the key member is disposed as shown in FIG. 3.

In operation, the drive assembly 21 functions in the rotisserie in the following manner.

Figure 4:
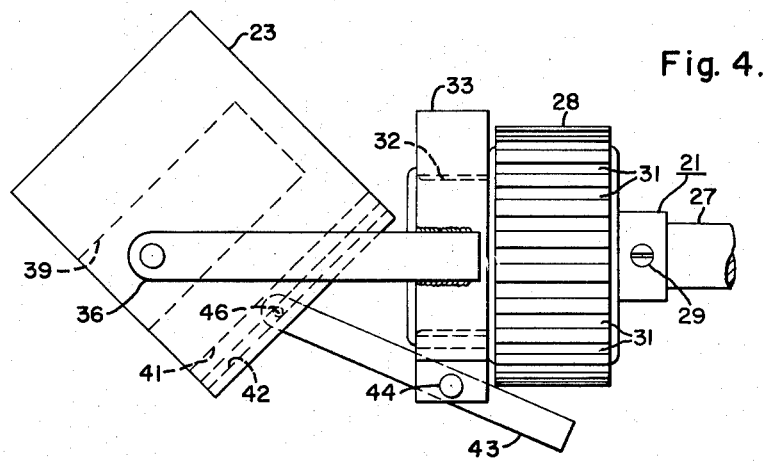
FIG. 4 is a top plan view similar to FIG. 3 showing the invention in operation.
Figure 5:
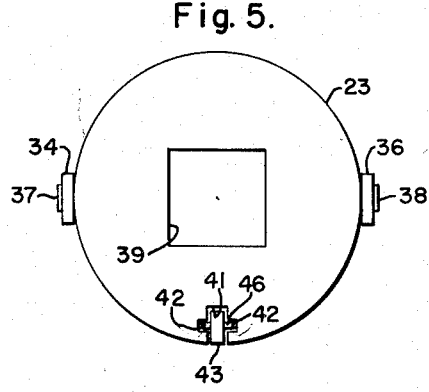
FIG. 5 is an elevational view taken along line V—V of FIG. 4.
Figure 6:
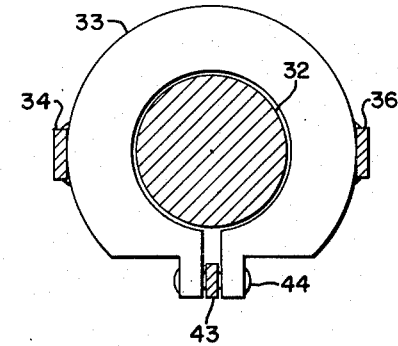
FIG. 6 is a sectional view taken along line VI—VI of FIG. 4.

With the members of the drive assembly 21 disposed as shown in FIG. 4, the collet 23 is positioned to receive the spit member 16 in axial engagement. It will be noted that with the collet 23 removed from axial alignment with the shaft 27, the key member 43 is pivoted about the pin 44 to a position wherein the end adjacent the spline ways 31 is removed from engagement with the spline ways. With the key member 43 disengaged from the spline ways 31, the bearing member 33 turns freely on the journal 32. Should the motor 22 be accidentally energized with the loaded spit 16 engaged in the collet 23 and the drive assembly 21 so disposed, no load would be put on the motor as it would turn freely without effecting the collet 23.

Referring back to FIGS. 1 and 2, it will be observed that the U-shaped opening 18 in the spit support means 19 is disposed in axial alignment with the shaft 27 of the motor 22. It should be obvious, therefore, that when the spit member 16 is placed in the enclosure 11 and disposed with the spool portion 17 in the U-shaped opening 18, the elements of the drive assembly 21 will be disposed as shown in FIG. 3. Referring to that figure, it will be observed that with the collet 23 in axial alignment with the shaft 27 the key member 43 is pivoted to a position wherein a portion of the member is received by a spline way 31 of the cylindrical member 28. The bearing member 33 is thereby restricted from movement on the journal 32, and rotation of the shaft 27 causes rotation of the collet 23. Since the collet 23 and spit 16 have a non-circular interfit 39, rotation of the collet rotates the spit and the food thereon.

For removal of the spit 16 from the collet 23 the spit need only be turned until the key member 43 is in a position facing the opening of the enclosure 11, in which position the drive assembly is rotated to a position as shown in FIG. 4.

Although the means for rotating the rotisserie is shown fixedly mounted adjacent an outer wall of the oven 10, it should be obvious that the use of the drive assembly 21 permits fixedly mounting the rotating means at a more remote point than shown, and even exterior to the oven.

It should therefore be evident that the invention provides an improved rotisserie arrangement wherein the spit is located in side-to-side relation to the oven enclosure, and wherein the employment of the novel drive assembly provides for fixedly attaching the spit rotating means at a point which may be remote from the hot oven enclosure.

While the invention has been shown in but one form, it will be obvious to those skilled in the art that it is not so limited, but is susceptible of various changes and modifications without departing from the spirit thereof.

I claim as my invention:

1. A drive assembly for a barbecue spit comprising
   a shaft,
   means for rotating said shaft,
   a bearing member journaled on said shaft,
   a collet pivotably mounted on said bearing member for receiving a barbecue spit, and
   means interconnecting said collet and said bearing member for rotatably interlocking said collet with said shaft when said collet is in axial alignment with said shaft,
   said means being effective to disengage said collet from said shaft when said collet is moved from axial alignment with said shaft thereby causing said collet to be uneffected by rotation of said shaft.

2. A drive assembly for a barbecue spit comprising,
   a shaft,
   means for rotating said shaft,
   a cylindrical member disposed on said shaft,
   said member comprising a portion having a splined outer surface and
   a journal portion disposed adjacent said splined portion,
   a bearing member received on said journal portion for rotation thereon,
   a support member having one end disposed on said bearing member and extending axially with respect to said shaft,
   a collet pivotably supported by said support member for receiving a barbecue spit, and
   a key member pivotably engaged on said bearing member and having an end pivotably received on said collet,
   a portion of said key member extending adjacent said splined surface and engaging a spline way thereof when said collet is in axial alignment with said shaft thereby causing said collet to be rotated by rotation of said shaft,
   and said portion of said key member being disengaged from said splined surface by movement of said collet from axial alignment with said shaft thereby causing said collet to be uneffected by rotation of said shaft.

3. The structure defined in claim 2 wherein said spit rotating means is an electrically powered motor.

4. An oven enclosure having a pair of spaced side walls and a front opening,
   a rotatable spit member disposed in said enclosure,
   support means in said enclosure having one end of said spit member received thereon,
   a shaft having its rotational axis substantially in alignment with said support means,
   a bearing member journaled on said shaft,
   a collet pivotably disposed on said bearing member adjacent one of said walls having the other end of said spit member received thereon,
   means interconnecting said collet and said bearing member for rotatably engaging said collet with said shaft when said collet is in axial alignment with said shaft,
   said means being effective to disengage said collet from said shaft when said collet is moved from axial alignment with said shaft, and
   said one end of said spit member being movable from a position in supported relation with said support means wherein operation of said rotating means causes rotation of said spit member, to a position adjacent said front opening wherein said spit member is uneffected by operation of said rotating means while said other end of said spit member is in engagement with said collet.

5. An oven enclosure having a pair of spaced side walls
   a rotatable spit member disposed in said enclosure,
   support means in said enclosure adjacent one side wall having one end of said spit member received thereon,
   a shaft having its rotational axis substantially in alignment with said support means,
   a bearing member journaled on said shaft,
   a collet pivotably disposed on said bearing member adjacent the other of said side walls having the other end of said spit member received in axially interfitting engagement,
   means for drivingly engaging said collet with said shaft when said collet is in axial alignment with said shaft,
   said means being effective to disengage said collet from said shaft when said collet is moved from axial alignment with said shaft, and
   said one end of said spit member being movable from a position in supported relation with said support means wherein operation of said rotating means causes rotation of said spit member, to a position adjacent said front opening wherein said spit member is uneffected by operation of said rotating means and said spit member is removable from said axially interfitting engagement.

6. The structure defined in claim 5 wherein said spit rotating means is an electrically powered motor.

7. An oven enclosure having a pair of spaced side walls and a front opening,
   a rotatable spit member disposed in said enclosure,
   support means in said enclosure having one end of said spit member received thereon,
   a shaft having its rotational axis substantially in alignment with said support means,
   a collet pivotably disposed on said shaft adjacent one of said walls having the other end of said spit member received thereon, and means disposed on said shaft for rotatably engaging said collet with said shaft when said collet is in axial alignment with said shaft, said means comprising;

a cylindrical member comprising a portion having a splined outer surface, and a journal portion disposed adjacent said splined portion, a bearing member received on said journal portion for rotation thereon, a support bar having one end disposed on said bearing member and extending axially with respect to said shaft for pivotably supporting said collet, a key member pivotably engaged on said bearing member and having an end pivotably received on said collet, a portion of said key member extending adjacent said splined surface and engaging a spline way thereof when said collet is in axial alignment with said shaft, and said portion of said keyway member being disengaged from said splined surface by movement of said collet from axial alignment with said shaft, said means thereby being effective to disengage said collet from said shaft when said collet is moved from axial alignment with said shaft, and said one end of said spit member being movable from a position in supported relation with said support means wherein operation of said rotating means causes rotation of said spit member, to a position adjacent said front opening wherein said spit member is uneffected by operation of said rotating means while said other end of said spit member is in engagement with said collet.

References Cited by the Examiner
UNITED STATES PATENTS

| | | | |
|---|---|---|---|
| 1,860,577 | 5/32 | Hedge | 99—421 |
| 1,946,062 | 2/34 | Cramp | 192—71 |
| 2,589,625 | 3/52 | Paul | 99—421 |
| 2,864,477 | 12/58 | Hollyday et al. | 192—71 |
| 3,058,414 | 10/62 | Armstrong | 99—421 |
| 3,100,435 | 8/63 | Mobley | 99—521 |

FOREIGN PATENTS 316,124   11/56   Switzerland.

OTHER REFERENCES

Structo Advertisement, Home Furnishings Daily, Jan. 4, 1962, Sec. 2, page 26.

ROBERT E. PULFREY, *Primary Examiner.*

LAWRENCE CHARLES, *Examiner.*